United States Patent [19]

Komanduri et al.

[11] Patent Number: 4,583,431
[45] Date of Patent: * Apr. 22, 1986

[54] SELF-SHARPENING COATED TOOL CONSTRUCTIONS

[75] Inventors: Ranga Komanduri; William R. Reed, Jr., both of Schenectady, N.Y.

[73] Assignee: General Electric Company, Schenectady, N.Y.

[*] Notice: The portion of the term of this patent subsequent to Sep. 10, 2002 has been disclaimed.

[21] Appl. No.: 438,684

[22] Filed: Nov. 3, 1982

[51] Int. Cl.$^4$ .................. B23B 1/00; B23B 27/14; B23B 27/22
[52] U.S. Cl. .................................. 82/1 C; 407/116; 407/119
[58] Field of Search ........ 76/101 R, 101 A, DIG. 11; 30/350; 407/119, 2–6, 100, 113–115, 118, 120; 409/66; 75/240, 241, 242; 428/571, 600

[56] References Cited

U.S. PATENT DOCUMENTS

| | | | |
|---|---|---|---|
| 1,769,222 | 7/1930 | Ignatieff | 407/116 |
| 2,370,273 | 2/1945 | Ulliman | 407/116 |
| 3,188,717 | 6/1965 | Hewlew | 407/113 |
| 3,341,920 | 9/1967 | Kelm | 407/113 |
| 3,343,431 | 9/1967 | Boyer | 407/113 |
| 3,344,496 | 10/1967 | Patkay | 407/114 |
| 3,369,283 | 2/1968 | Colding | 407/113 |
| 3,416,209 | 12/1968 | Contrucci | 407/113 |
| 3,520,041 | 7/1970 | Shephard | 407/117 |
| 3,564,683 | 2/1971 | Schedler et al. | 407/119 |
| 3,618,654 | 11/1971 | Meserue | 407/120 |
| 3,745,623 | 7/1973 | Wentorf | 407/114 |
| 3,850,053 | 11/1974 | Bovenkerk | 407/119 |
| 3,947,937 | 4/1976 | Hertel | 407/114 |
| 4,111,589 | 9/1978 | Goeke | 407/114 |
| 4,248,553 | 2/1981 | Kraemer | 407/114 |
| 4,294,566 | 10/1981 | Boone | 407/114 |
| 4,449,864 | 5/1984 | Haque et al. | 407/113 |

FOREIGN PATENT DOCUMENTS

| | | | |
|---|---|---|---|
| 453004 | 11/1948 | Canada | 407/116 |
| 877531 | 5/1953 | Fed. Rep. of Germany | 407/116 |
| 1070898 | 12/1959 | Fed. Rep. of Germany | 407/115 |
| 210706 | 8/1960 | Fed. Rep. of Germany | 407/116 |
| 73392 | 6/1979 | Japan | 407/119 |
| 38755 | 11/1979 | Japan | 407/119 |
| 44765 | 4/1981 | Japan | 407/119 |
| 197707 | 10/1977 | U.S.S.R. | 407/116 |
| 709258 | 1/1980 | U.S.S.R. | 407/116 |

OTHER PUBLICATIONS

Production Technology Abroad by Dr. M. Barash Manufacturing Engineering, Mar. 1980.
Moscow Institute Instruments with Shortened Surfaces, Trudy #34, 1961, pp. 120–127.
The Wear of Forming Tools with a Shortened Back Surface, Vestmk Mashino Stroyeniga, 1979, No. 5, pp. 54–55.
Heat Build Up on the Wearing Surfaces of Cutting Tools, 1963, Journal of Mechanicall Engineering.
Status Report, Cutting Tool Materials, Metal Progress, Nov. 1983, pp. 21–27.

Primary Examiner—Francis S. Husar
Assistant Examiner—Jerry Hearns
Attorney, Agent, or Firm—James Magee; James C. Davis, Jr.

[57] ABSTRACT

An improved self-sharpening refractory metal cutting tool presenting an overhanging cutting element of width about equal to the depth of the cut to be taken and of maximum thickness equal to tolerable tool flank wear is provided with a thin, chemically stable, chemically inert refractory coating metallurgically bonded to the rake face of the tool, at least on the rake face of the cutting element.

19 Claims, 5 Drawing Figures

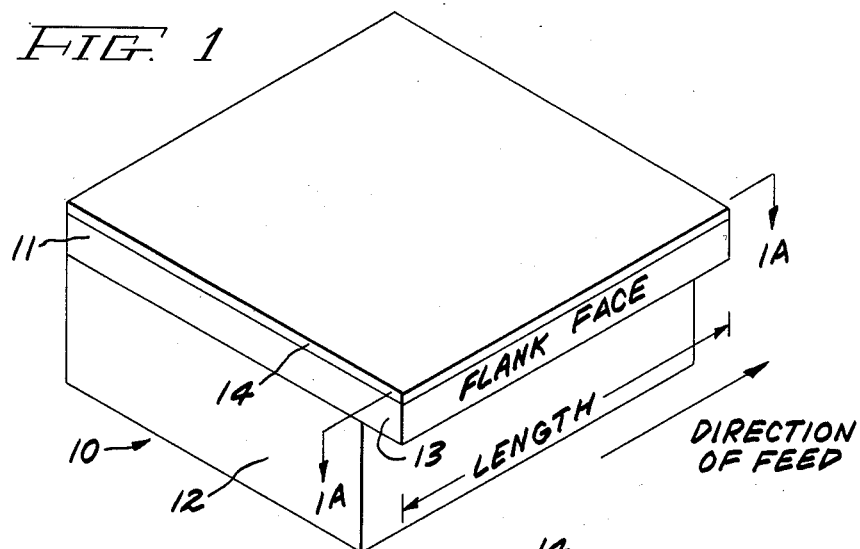
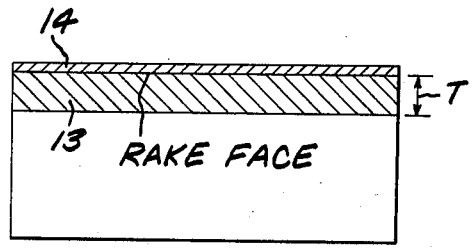
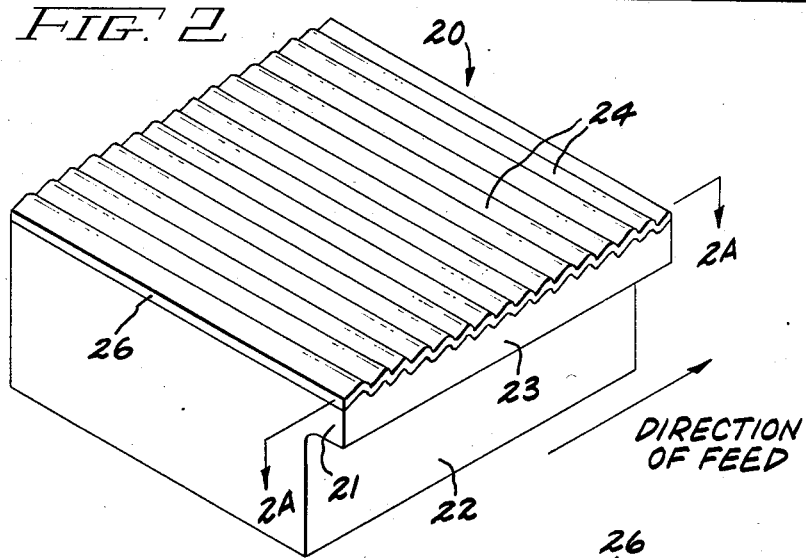
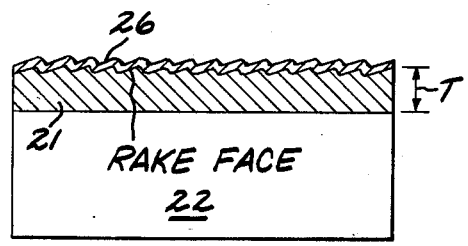

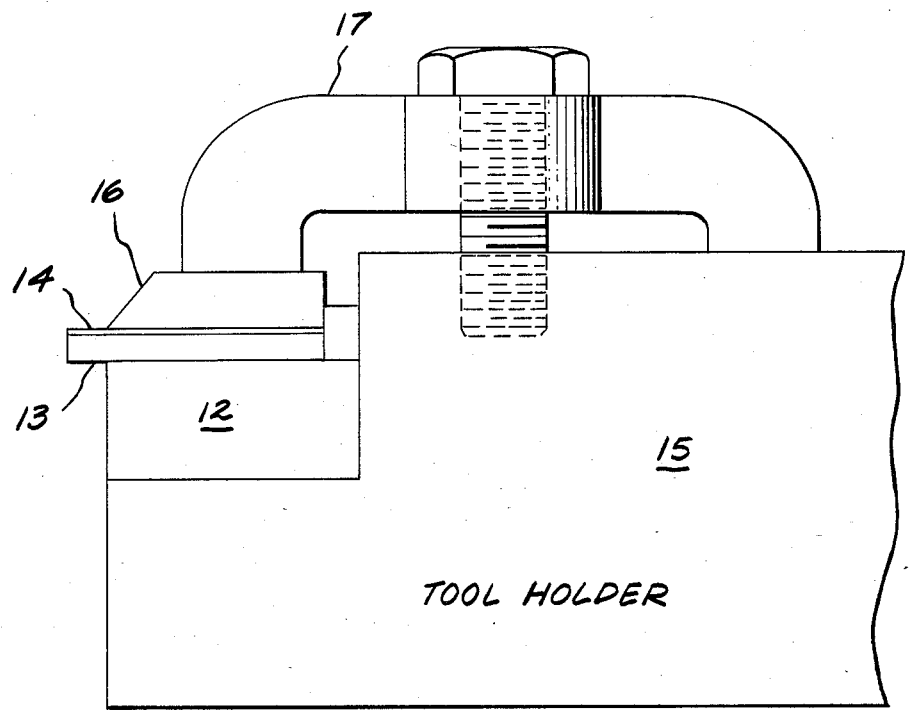

SELF-SHARPENING COATED TOOL CONSTRUCTIONS

The present invention relates generally to improvements in certain cutting tool insert constructions, which are self-sharping and have special utility in the machining of hard-to-machine metallic articles. The latter cutting tool inserts each embodying a consumable overhanging ledge are the prior invention of another and are described in U.S. patent application Ser. No. 331,341—Lee et al., filed Dec. 16, 1981, which application is assigned to the assignee of the instant invention and is incorporated by reference.

"Self-sharpening" as the term is used in Ser. No. 331,341 and in this specification and the appended claims means and refers to the unique characteristic of retention of cutting ability of the cutting element of the tool insert as it is consumed lengthwise during the cutting operation. Thus, unlike heretofore conventional milling and turning cutters, the self-sharpening tool insert constructions of this invention do not require regrinding to sharpen them so that catastrophic escalation of the cutting force does not occur as workpiece material removal proceeds.

The term "integral" and "integrally-formed" as used in Ser. No. 331,341 and in this application for certain of the tool constructions disclosed herein and in the appended claims mean and refer to a unitary body providing both the cutting and support functions as distinguished from a composite of articles separately formed to independently carry out these functions and thereafter temporarily or permanently joined, bonded or otherwise secured together to carry on a machining operation.

A prime advantage of the consumable tool insert constructions disclosed and claimed in Ser. No. 331,341 is the capability afforded thereby for operation at higher speeds than with conventional tool inserts. This is particularly important, when machining titanium alloys. Occasionally, however, during the high speed machining of titanium alloys with these tool inserts sparking has occurred. Investigation has shown that in those instances in which sparking has occurred, thin secondary chips were being formed and these secondary chips were reacting with the air. Manifestly, it would be desirable to prevent formation of secondary chips in order to increase the safety of high speed machining of reactive metals such as titanium alloys.

One solution to this problem is described and claimed in our copending U.S. patent application Ser. No. 438,685—Komanduri and Reed, filed Nov. 3, 1982, and assigned to the assignee of this application. Ser. No. 438,685 is incorporated herein by reference.

DESCRIPTION OF THE INVENTION

The invention lies in the elimination of secondary chip formation, which can occur intermittently, during machining with self-sharpening tool insert construction comprising in combination a consumable longitudinally-extending cutting element and means for supporting such cutting element. The consumable cutting element of substantially uniform thickness (i.e. about 20 mils to about 80 mils) overhangs the support means such that it presents the flank face for the tool insert a substantially uniform distance (i.e. about 20 mils to about 80 mils) from the support means. This invention in its simplest terms comprises the provision of one or more thin coatings (i.e. about 5 micrometers thick) of chemically stable and inert refractory material(s) metallurgically bonded to the rake face of the cutting element. In the event that this rake face has longitudinally-extending chip-grooves formed therein as in Ser. No. 438,685 (such chip-grooves extending generally perpendicular to the flank face on the cutting element and being utilized one by one in sequence to guide the chip as the cutting element is consumed along its length), the coating(s) can be applied as well to shield this modified rake face from chemically interacting with or welding to the workpiece.

BRIEF DESCRIPTION OF THE DRAWING

The features of this invention believed to be novel and unobvious over the prior art are set forth with particularity in the amended claims. The invention itself, however, as to the organization, method of operation and objects and advantages thereof, may best be understood by reference to the following description taken in conjunction with the accompanying drawing wherein:

FIG. 1 is a schematic three-dimensional representation showing the application of this invention to the plate and support assembly version of the consumable tool;

FIG. 1A is a sectional view taken on line 1A—1A of FIG. 1;

FIG. 2 is a schematic three-dimensional representation showing the application of this invention to an integral tool insert with a consumable cutting element and chip-grooves formed in the rake face;

FIG. 2A is a sectional view taken on line 2A—2A of FIG. 26; and

FIG. 3 is a schematic side view in elevation of a tool insert of this invention and a supporting block therefor clamped in a tool holder.

MANNER AND PROCESS OF MAKING AND USING THE INVENTION

The self-sharpening tool insert constructions to which this invention relates comprise in combination a consumable longitudinally-extending cutting element and means for supporting such cutting element. In one version, the cutting element and the supporting means are formed integrally and in the second version, the cutting element is part of a body (e.g. a flat plate) separate from the support means except during the machining operation, when these parts are fixedly related to establish the cutting element.

The latter version is illustrated in FIGS. 1 and 1A. In the assembly 10 the portion providing the cutting element is preferably in the shape of a flat plate 11 (e.g. a prism) of substantially uniform thickness with substantially parallel opposite major surfaces. Plate 11 (i.e. the tool insert) is arranged on support member 12 so that it overhangs the support to provide the properly dimensioned ledge, or flange, 13 (i.e. the cutting element portion), to be consumed in the lengthwise direction thereof during use.

As is shown in FIG. 3 tool assembly 10 in use would be mounted in a tool holder 15 with tool insert 11 on support block 12. These parts are held in place by chip breaker 16 and clamp 17 with a portion of plate 11 overhanging support 12 to provide the properly dimensioned cutting element 13.

The former version is shown in FIGS. 2 and 2A. Overall, insert 20 is in the general configuration of a hexahedron with a portion removed from one side to define an integrally-formed ledge 21 extending from supporting face 22 and presenting flank face 23. Ledge 21 is in effect a flange, as it extends a uniform distance from face 23. The upper surface of ledge 21 (i.e. the rake face) has a series of longitudinally-extending chip-grooves 24 formed therein. These chip-grooves, arcuate in cross-section, run generally perpendicular to flank face 23.

In both versions, the consumable cutting element overhangs the support so as to dispose its flank face at a distance in the range of from about 20 mils to about 80 mils (preferably from 30 mils to 50 mils) from the support face and will have a uniform thickness (T) in the range of from about 20 mils to about 80 mils (also, preferably from 30 mils to 50 mils). The selection of particular dimensions for the overhanging consumable portion (i.e. the cutting element 13 or 21) will depend upon the strength of the material of which the cutting element is made, the cut to be made, expected tool life, etc. As a practical matter, the longitudinal length of the cutting element should be at least ¼ inch long.

It will be understood that the self-sharpening tool insert of whatever refractory or other material it may be made, is producible either directly in its ultimate shape as by cold pressing and then sintering or indirectly by producing first an oversized tool blank and then carrying out a shaping operation in which the tool blank is cut or trimmed to provide the requisite overhanging consumable cutting element projecting from the support face and the chip-grooves.

During the machining operation with these self-sharpening tool inserts, cutting element 13 or 21 is worn away along its length as machining proceeds. Occasionally during the high speed machining of titanium alloys with these tool inserts, sparking has occurred. It has been determined that this sparking results from the formation of thin secondary chips, much finer than the main chip from which they separate and these secondary chips were reacting with the air. This invention addresses the problem of secondary chip formation by providing over the rake face of cutting elements 13 and 21 at least one thin coating 14, 26, respectively, of refractory material, which has the property of preventing interaction between the tool insert and the workpiece responsible for secondary chip formation, whether this interaction be chemical in nature or the result of welding.

The materials used for coating tools according to this invention include single coatings of TiC, TiN, Al$_2$O$_3$, HfN or HfC, and multiple coatings of Al$_2$O$_3$ to TiN on top of TiC. In the case of applying a coating of TiC or Al$_2$O$_3$, or their combination in layers, by chemical deposition to a tool body, the tool body is initially heated to about 1000° C. When applying TiN coatings by physical vapor deposition, the deposition temperature is less than 1000° C. By way of example, in applying a TiC coating, TiCl$_4$ and methane are reacted in a hydrogen atmosphere at a pressure of one atmosphere or less. TiC deposits on the tool body and establishes a metallurgical bond with the substrate at high temperatures. An alternate reaction involves TiCl$_4$ and carbon (if present in the substrate as, for example, cemented carbide) reacting in a hydrogen atmosphere. Although the typical coating thickness is about 5 micrometers, thicknesses in the 2-10 micrometer range can be effective for the purposes of this invention.

Although the coating materials described hereinabove are known in the art, one novel aspect of this invention is the determination that such coatings provide a solution to the secondary chip formation problem. Another novel aspect of this invention is the discovery that a particularly advantageous combination of materials for the high speed machining of titanium alloys is afforded by the application of a thin coating of TiN to the rake face of a cemented tungsten carbide consumable element in which the cobalt cementing medium is present in a concentration of less than about 6% by weight.

An example illustrative of the use of the latter construction is set forth below.

EXAMPLE

As is shown in FIG. 3, a flat plate 13 (30 mils thick) of Carboloy ® tungsten carbide Grade 883 (6% cobalt by weight) was clamped in place with a uniform overhang (i.e. depth of cut) of 30 mils, a back rake angle of −5°, a side rake angle of −5°, and clearance angle of 1° with the workpiece. The workpiece, a solid cylinder of titanium (6Al-4V) was rotated at 600 surface feet per minute in a Lodge and Shipley lathe. The feed was 0.009 inch. As machining progressed, thin secondary chips were found to form periodically, which reacted with air and caused occasional sparks.

When the flat tungsten carbide plate as replaced with a plate of the same material, dimensions and manner of support having a coating of about 5 micrometers of TiN metallurgically bonded to its upper surface, and the machining was carried on as described above, secondary chip formation ceased.

What we claim as new and desire to secure by Letters Patent of the United States is:

1. In a cutting tool arrangement in which a tool insert of refractory material is rigidly held in a tool holder, said tool holder being adjustably mounted so as to bring said tool insert into contact with a metal workpiece to alter the shape thereof by the removal of metal therefrom; said tool insert comprising in combination a longitudinally-extending cutting element extending along at least one side of said tool insert to provide flank and rake faces for said tool insert and means for supporting said cutting element formed integrally therewith; said cutting element (a) overhanging said support means to present the flank face of said tool insert a substantially uniform distance in the range of from 20 mils to 80 mils from said support means, (b) having a maximum thickness in the range of from 20 mils to 80 mils, (c) being of substantially uniform transverse cross-section along said length, and (d) being progressively consumed along the length thereof during use of said tool insert, the improvement wherein said rake face is modified by the presence of at least one coating about 2–10 micrometers thick of chemically stable, chemically inert refractory material metallurgically bonded to said rake face.

2. The improvement recited in claim 1 wherein the material of the refractory coating is selected from the group consisting of TiC, TiN, Al$_2$O$_3$, HfN and HfC.

3. The improvement recited in claim 1 wherein the tool insert is of cobalt cemented tungsten carbide having a cobalt content of less than about 6% by weight and the coating is titanium nitride.

4. The cutting tool arrangement recited in claim 1 wherein as part of the improvement the rake face of the cutting element, which in turn has the refractory coating bonded thereto, has also been modified by the presence of a plurality of longitudinally-extended chip-grooves formed in sequence therein, said chip-grooves extending generally perpendicular to the flank face.

5. The improvement recited in claim 4 wherein the refractory coating material is selected from the group consisting of TiC, TiN, Al$_2$O$_3$, HfN and HfC.

6. The improvement recited in claim 4 wherein the tool insert is of cobalt cemented tungsten carbide having a cobalt content of less than about 6% by weight and the coating is titanium nitride.

7. In a cutting tool arrangement in which a tool insert of refractory material is rigidly held in a tool holder, said tool holder being adjustably mounted so as to bring said tool insert into contact with a metal workpiece to alter the shape thereof by the removal of metal therefrom; said tool insert being a flat plate of substantially uniform thickness in the range of from 20 mils to 80 mils; said plate being fixedly disposed on a separate support therefor in overhanging relationship therewith to define a cutting element portion of said plate, said cutting element portion providing flank and rake faces for said tool insert, said flank face of said cutting element portion being located a substantially uniform distance in the range of from 20 mils to 80 mils from said support and said cutting element portion (a) having a maximum thickness in the range of from 20 mils to 80 mils and (b) being progressively consumed along the length thereof during use, the improvement wherein said rake face is modified by the presence of at least one coating about 2-10 micrometers thick of chemically stable, chemically inert refractory material metallurgically bonded to said rake face.

8. The improvement recited in claim 7 wherein the material of the refractory coating is selected from the group consisting of TiC, TiN, Al$_2$O$_3$, HfN and HfC.

9. The improvement recited in claim 7 wherein the tool insert is of cobalt cemented tungsten carbide having a cobalt content of less than about 6% by weight and the coating is titanium nitride.

10. The cutting tool arrangement recited in claim 7 wherein as part of the improvement the rake face of the cutting element, which in turn has the refractory coating bonded thereto, has also been modified by the presence of a plurality of longitudinally-extending chip-grooves formed in sequence therein, said chip-grooves extending generally perpendicular to the flank face.

11. The improvement recited in claim 10 wherein the refractory material is selected from the group consisting of TiC, TiN, Al$_2$O$_3$, HfN and HfC.

12. The improvement recited in claim 10 wherein the tool insert is of cobalt cemented tungsten carbide having a cobalt content of less than about 6% by weight and the coating is titanium nitride.

13. In the construction of a cutting tool insert of refractory material, said tool insert comprising in combination a longitudinally-extending cutting element extending along at least one side of said tool insert to provide flank and rake faces for said tool insert and means for supporting said cutting element formed integrally therewith; said cutting element (a) overhanging said support means to present the flank face of said tool insert a substantially uniform distance in the range of from 20 mils to 80 mils from said support means, (b) having a maximum thickness in the range of from 20 mils to 80 mils, (c) being of substantially uniform transverse cross-section along said length and (d) being progressively consumed along the length thereof during use of said tool insert, the improvement wherein said rake face is modified by the presence of at least one coating about 2-10 micrometers thick of chemically stable, chemically inert refractory material metallurgically bonded to said rake face.

14. The improvement recited in claim 13 wherein the material of the refractory coating is selected from the group consisting of TiC, TiN, Al$_2$O$_3$, HfN and HfC.

15. The improvement recited in claim 13 wherein the material of the tool insert is of cobalt cemented tungsten carbide having a cobalt content of less than about 6% by weight and the coating is titanium nitride.

16. The cutting tool arrangement recited in claim 13 wherein as part of the improvement the rake face of the cutting element which in turn has the refractory coating bonded thereto, has also been modified by the presence of a plurality of longitudinally-extending chip-grooves formed in sequence therein, said chip-grooves extending generally perpendicular to the flank face.

17. The improvement recited in claim 16 wherein the refractory material is selected from the group consisting of TiC, TiN, Al$_2$O$_3$, HfN and HfC.

18. The improvement recited in claim 16 wherein the tool insert is of cobalt cemented tungsten carbide having a cobalt content of less than about 6% by weight and the coating is titanium nitride.

19. The high-speed method for machining titanium and titanium alloys which comprises the steps of:
(a) providing and rigidly mounting a cutting tool adjacent a workpiece of titanium or titanium alloy with a cantilevered longitudinally-extending portion of said tool as the cutting element thereof, the material of said cutting element being cobalt cemented tungsten carbide having a cobalt content of less than about 6% by weight, said cutting element providing the flank and rake faces of said tool with said flank face being located a substantially uniform distance in the range of from 20 mils to 80 mils from any support for said cutting element, said cutting element (a) having a maximum substantially uniform thickness in the range of from 20 mils to 80 mils, (b) being of substantially uniform transverse cross-section along said length and (c) having at least one coating about 2-10 micrometers thick of titanium nitride metallurgically bonded to said rake face;
(b) causing relative rotation to occur between said cutting element and said workpiece;
(c) bringing the leading end of said cutting element against said workpiece;
(d) providing a clearance angle of about one degree or less between said flank face and said workpiece thereby having the trailing end of said cutting element out of contact with said workpiece, and
(e) advancing said tool and maintaining contact between the leading end of said cutting element and said workpiece as metal is removed from said workpiece and said cutting element is consumed along the length thereof.

* * * * *